(12) United States Patent
Carbonini et al.

(10) Patent No.: US 8,337,925 B2
(45) Date of Patent: Dec. 25, 2012

(54) DEVICE AND COMPONENT FOR ADMIXING A FLUID TO A BEVERAGE

(75) Inventors: Carlo Carbonini, Villastanza di Parabiago (IT); Stefano Raimondi, Villastanza di Parabiago (IT)

(73) Assignee: Rancilio Macchine per Caffe' S.p.A., Villastanza di Parabiago (IT)

( * ) Notice: Subject to any disclaimer, the term of this patent is extended or adjusted under 35 U.S.C. 154(b) by 306 days.

(21) Appl. No.: 12/988,255

(22) PCT Filed: Apr. 15, 2009

(86) PCT No.: PCT/IB2009/051569
§ 371 (c)(1),
(2), (4) Date: Oct. 15, 2010

(87) PCT Pub. No.: WO2009/128036
PCT Pub. Date: Oct. 22, 2009

(65) Prior Publication Data
US 2011/0039000 A1   Feb. 17, 2011

(30) Foreign Application Priority Data
Apr. 18, 2008   (EP) .................................... 08425263

(51) Int. Cl.
*A47J 31/44* (2006.01)

(52) U.S. Cl. .......................... 426/474; 99/323.1; 138/44
(58) Field of Classification Search .................. 426/474; 99/323.1; 138/44
See application file for complete search history.

(56) References Cited

U.S. PATENT DOCUMENTS
5,335,588 A    8/1994   Mahlich

OTHER PUBLICATIONS
International Search Report of PCT/IB2009/051569 dated Jul. 20, 2009.

*Primary Examiner* — Anthony Weier
(74) *Attorney, Agent, or Firm* — Sughrue Mion, PLLC

(57) ABSTRACT

The present invention relates to a component configured to be associated with a pipe arranged to supply a pressurized fluid into a beverage in order to admix the fluid to the beverage. The component includes a venturi having a first, upstream region at high pressure and low kinetic energy, and a second, downstream region at low pressure and high kinetic energy for said fluid. In the component, a first plurality of throughholes forms the venturi and puts the first region into communication with the second region, and a second plurality of throughholes is arranged so as to converge towards the second region. The present invention also relates to a device including the component and to a method of admixing a fluid to a beverage.

20 Claims, 4 Drawing Sheets

DEVICE AND COMPONENT FOR ADMIXING A FLUID TO A BEVERAGE

TECHNICAL FIELD

The present invention generally relates to a device and a related component for admixing a fluid, in particular air and/or steam, to a beverage.

More particularly, the present invention relates to a steam conveying component (steam pipe) or an accessory component (diffuser) associated or associable with the steam pipe, which component(s) can be utilised for instance in an espresso coffee machine for preparing hot and/or frothed milk by introducing steam into milk contained in a pot.

For easiness of description, hereinafter reference will be made to a device comprising a steam pipe and associated with a coffee machine. Yet, as it will be readily understood by the skilled in the art, the device according to the invention can be any device including a component conveying a fluid suitable for being admixed to a beverage, such as for instance air, and included with other kinds of apparatuses, without thereby departing from the scope of description.

PRIOR ART

Devices are known arranged to convey steam and/or air into a beverage and to mix them with the beverage itself, for instance for heating and/or frothing it or for obtaining an emulsion.

Generally, such devices comprise a steam pipe, one end of which is immersed into the beverage, and in some cases they exploit the so-called Venturi effect in order to improve mixing between steam and the beverage.

For instance, U.S. Pat. No. 5,335,588 discloses a steam pipe and a pipe steam accessory configured so that the end portion to be introduced into the liquid forms a venturi.

The known device, which is herein considered as the closest prior art for the present invention, comprises, in correspondence of the region of maximum depression and maximum kinetic energy of the steam in the venturi, a conduit arranged to exploit the depression in order to suck milk and external air and to mix external air, steam and milk in the same venturi.

The prior art solution has the problem that the amount of external air, steam and milk being moved and mixed is very limited, so that the time taken to obtain a good mixture of air, steam and milk is high, since the kinetic energy of steam is not wholly exploited.

In the same technical field, a device for preparing frothed milk and comprising a steam pipe with a plurality of openings at its end through which steam is introduced into the beverage is also known from patent publication U.S. 2003/0131735.

The prior art pipe comprises a sleeve projecting from the beverage and narrowing at its end so as to give rise to Venturi effect assisting in external air inflow at the end immersed in the beverage. In such prior art, Venturi effect is exploited to make external air inflow into the beverage easier.

The Applicant has realised that the prior art devices, exploiting Venturi effect for introducing a fluid, such as for instance air and/or steam, into a beverage and mixing the fluid with the beverage, do not optimise the mechanical movements of the beverage and, therefore, they generally do not optimise the exploitation of the kinetic energy got by the fluid by Venturi effect in order to quickly and effectively obtain the desired effects, such as heating or frothing of the beverage.

DESCRIPTION OF THE INVENTION

It is an object of the present invention to solve the aforementioned technical problem of the prior art, in particularly of the closest prior art.

The object is achieved by the device and the related component for admixing a fluid, in particular air and/or steam, to a beverage, as claimed herein.

The present invention also concerns a method of admixing a fluid to a beverage.

The claims are integral part of the technical teaching provided herein in respect of the invention.

According to a preferred embodiment, the device for admixing a fluid to a beverage comprises a pipe and a component associated with the pipe and having a first plurality of throughholes arranged to form a venturi with an outlet region at low pressure and high kinetic energy, and a second plurality of throughholes arranged so as to converge towards the region at low pressure and high kinetic energy.

According to another feature of the present invention, the first plurality of holes in the component is arranged along a first circumference, and the second plurality of holes is arranged along a second circumference.

According to a further feature of the present invention, the component or diffuser generates a high pressure difference between the inside and the outlet of the pipe by means of the first plurality of throughholes and by Venturi effect. Thus, the kinetic energy of the fluid, e.g. steam, obtained in this way, is exploited to move the beverage by sucking it, through the second plurality of holes, from areas close to the diffuser towards the outlets of the holes in the first plurality of holes. Thus, thanks to its configuration, the diffuser generates a beverage circulation assisting in the mixing and heat exchange between the steam and the beverage and, where present, air.

BRIEF DESCRIPTION OF THE FIGURES

The above and other features and advantages of the present invention will become apparent from the following description of preferred embodiments, made only by way of non-limiting example with reference to the accompanying Figures, in which elements denoted by a same or similar numerical reference correspond to components having the same or similar function and construction, and in which.

DESCRIPTION OF A PREFERRED EMBODIMENT

Figure 1:
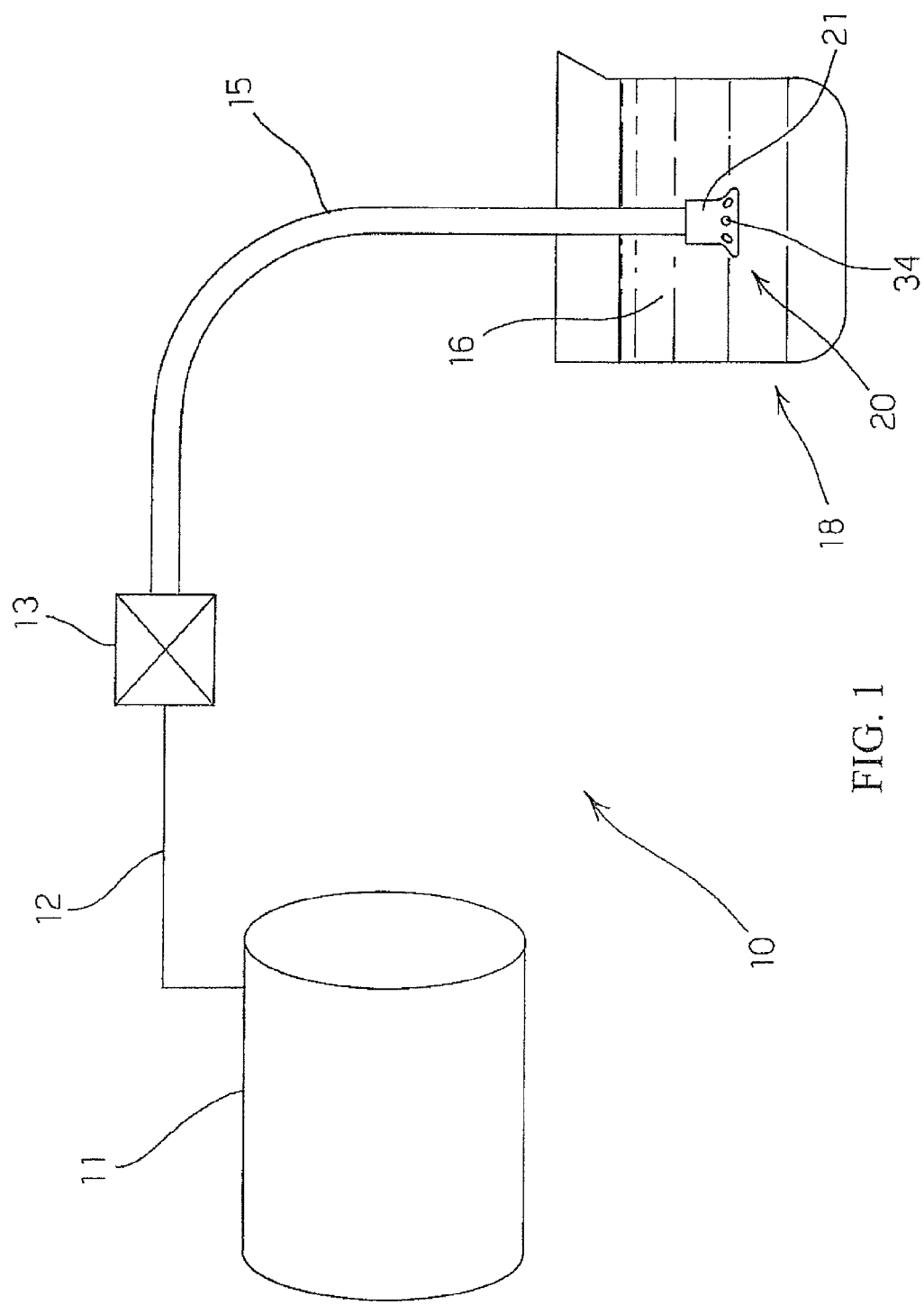
FIG. 1 schematically shows a device comprising an end component according to the invention.
Figures 2A, 2B:
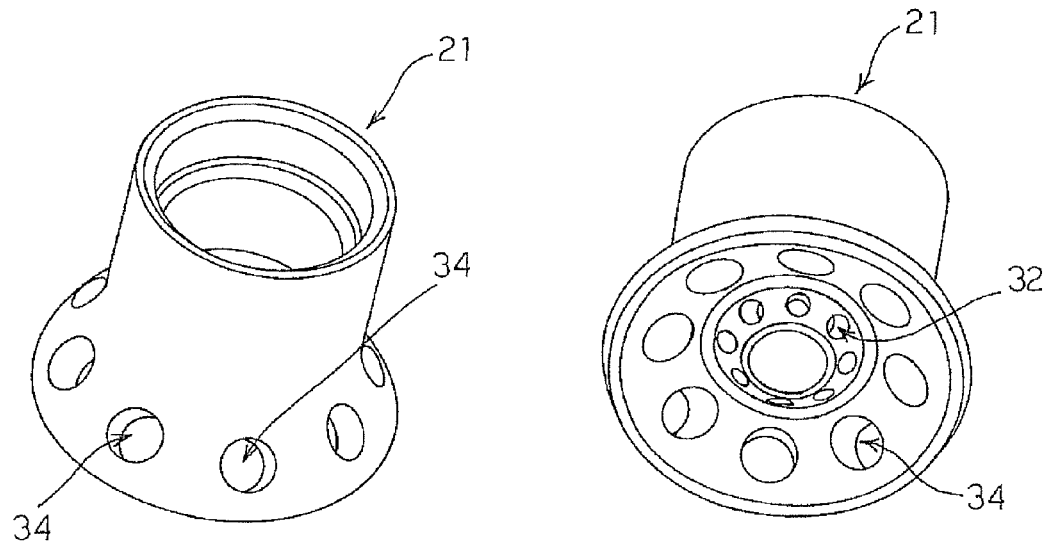
FIGS. 2a and 2b are perspective views of the end component shown in FIG. 1.

Referring to FIG. 1, a device 10 for admixing steam to a beverage 16, which device is referred to herein for simplicity of description, includes a conduit 12 having an inlet connected to a boiler 11, for instance a boiler of a coffee machine arranged to generate pressurised steam, and an outlet connected to a component (steam pipe or pipe) 15 of which one end 20 is shaped so as to convey the pressurised steam into a pot 19 containing beverage 16, for instance milk.

Preferably, device 10 also includes a valve 13, e.g. a manual valve, located between the outlet of duct 12 and pipe 15 and arranged to regulate the pressurised steam flow from boiler 11 to beverage (milk) 16 through pipe 15. In other embodiments, the valve could even be located along duct 12, between two sections of the same duct.

In other embodiments, the device, as it can be readily understood by the skilled in the art, can be any device arranged to introduce a pressurised fluid into a beverage, without thereby departing from the scope of what is described and claimed.

Hereinafter, however, reference is preferably made to the device shown in FIG. 1 which, in the configuration described, is arranged to admix steam to milk in order to heat and/or froth it.

In a first embodiment (FIG. 1, FIG. 2a, FIG. 2b, FIG. 3a), pipe 15 comprise an end member or component 21, connected or associated with end 20. Component 21 is arranged for instance so that its longitudinal axis coincides with the axis of the pipe end and is configured, as it will be described below in detail, so that steam is mixed with milk 16 in optimised manner.

According to variants of said first embodiment, end 20 of the same pipe 15 can be configured so as to build component (diffuser or mixer) 21.

Diffuser 21 has a cross-sectional narrowing 31 in a first region (upstream region or region A), in the direction towards end 20 of pipe 15, where steam is at high pressure and low kinetic energy, such narrowing being obtained for instance by means of a first plurality of throughholes 32 whose inlets are located in correspondence of region A. Such a first plurality of holes 32, having an overall cross-sectional size smaller than that of the pipe, is arranged to form narrowing 31 and consequently, to produce a Venturi effect obtained by means of a plurality of venturi, as it can be readily understood by the skilled in the art.

High pressure and low kinetic energy region A preferably ends into a conical portion but, as it can be readily understood by the skilled in the art, such region can also have other cross-sectional shapes, without thereby departing from the scope of what is described and claimed.

Throughholes 32 in the first plurality have respective downstream outlets in a second region (downstream region or region B) in the direction of milk 16 to be heated.

Region B preferably has a cross-sectional widening 33, for instance with a frusto-conical shape, where steam maintains a low pressure and a high kinetic energy due to Venturi effect, in particular near the outlet of each hole (region B1).

In accordance with the first embodiment, the holes in the first plurality of holes (first holes) 32 preferably have cylindrical shape and are arranged along a first circumference of given radius.

More preferably, first holes 32 are arranged so as to direct steam at an angle of 0° to 45° relative to the longitudinal axis. Still more preferably, first holes 32 are oriented so as to diverge from the longitudinal axis and to diffuse steam at an angle greater than 0°.

In accordance with the first embodiment, widening 33 has an outer edge 35 projecting from pipe 15 and having, between outer rim 35a and base 35b, a second plurality of throughholes 34, for instance holes with cylindrical shape arranged along a second circumference whose radius is greater than that of the first circumference. Such holes in the second plurality of throughholes (second holes) 34 are arranged to put region B1-B, located close to the outlet of the first holes 32 and internal to widening 33, into communication with a third region (outer region or region C) external to diffuser 21 and pipe 15, and to direct the milk flow from region C (inlet to the second holes) to region B1-B (outlet from the second holes), where steam has low pressure and high kinetic energy.

Preferably, the holes in the second plurality of holes (second holes) 34 are arranged so as to direct the milk flow at an angle of 90° to 135° relative to the longitudinal axis. More preferably, second holes 34 are oriented so as to define an angle of about 90° with the first holes.

The described structure that, in accordance with the first embodiment, has a first crown of throughholes surrounded by a second crown of throughholes, allows optimising the mechanical movements of milk and, consequently, steam admixing to milk, as it will be described in detail below.

Figure 3A:
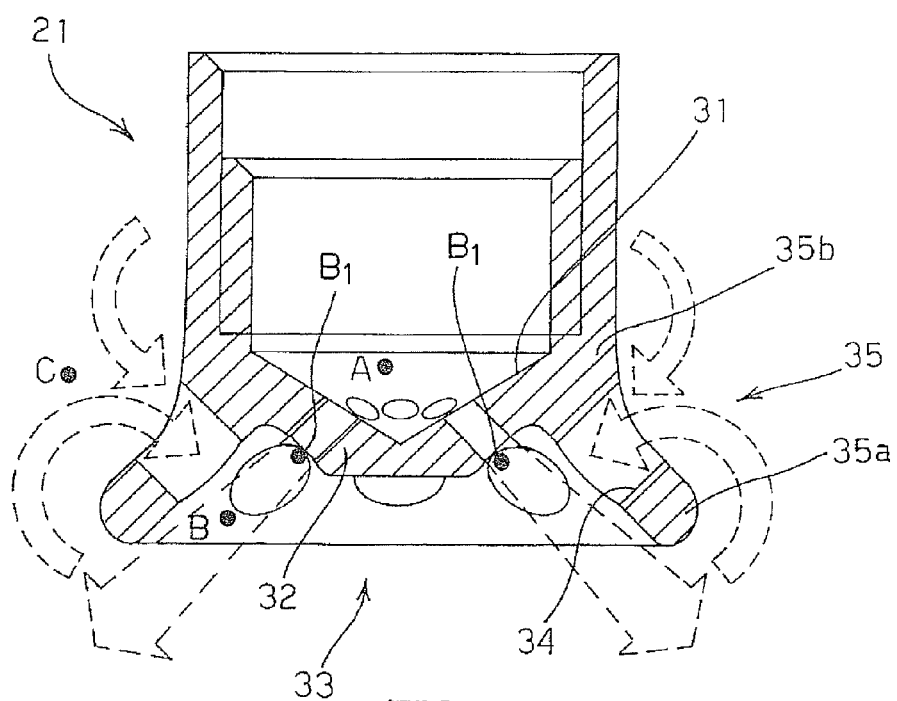
FIG. 3a is a schematic cross-sectional view of the component shown in FIGS. 2a and 2b.
Figure 3B:
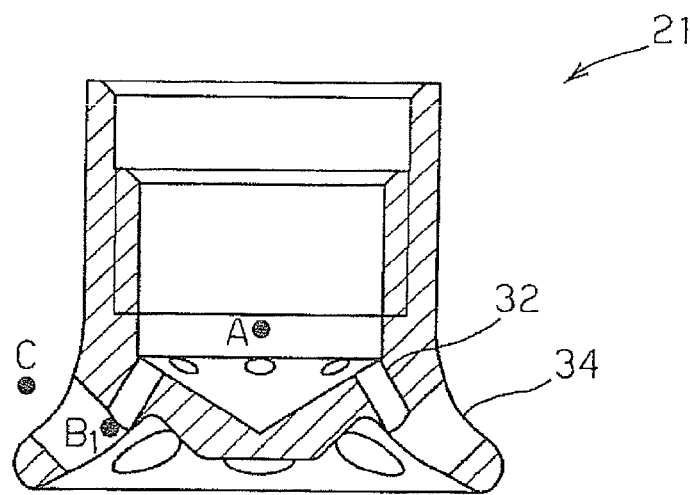
FIG. 3b is a schematic cross-sectional view of an end component according to a second embodiment.

In accordance with a second embodiment of diffuser 21, shown in FIG. 3b, the outlets of first holes 32 are located in correspondence of the outlets of second holes 34, so that low pressure and high kinetic energy regions B1 and B substantially coincide and allow optimising the mechanical movements of the milk.

Figure 4:
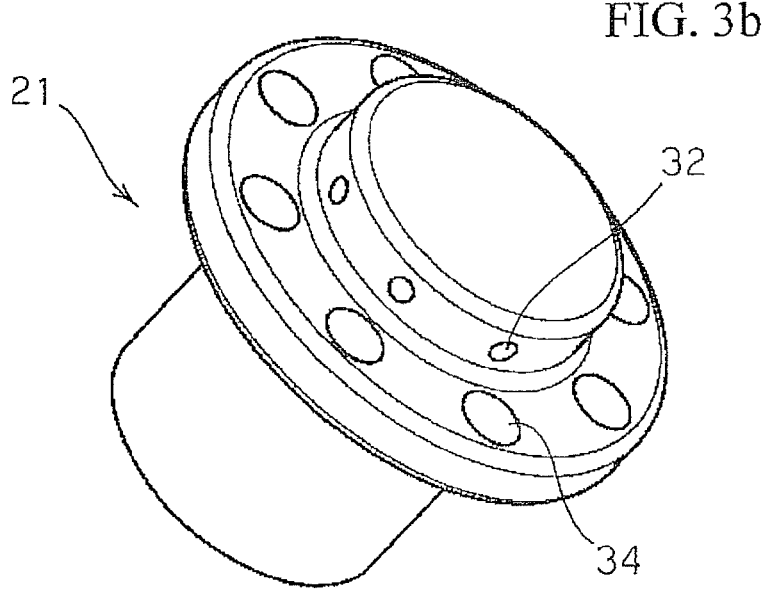
FIGS. 4 to 7 are respective perspective views of end components according to further embodiments.

In accordance with a third embodiment of diffuser 21, shown in FIG. 4, first holes 32, for instance holes with cylindrical shape and circular cross-section, are orthogonally and radially arranged relative to the longitudinal axis of diffuser 21, and second holes 34, for instance holes with cylindrical shape and circular cross-section, are arranged substantially parallel relative to the longitudinal axis of the diffuser, upstream first holes 32.

Such an embodiment allows obtaining substantially equivalent effects to those of the first embodiment as far as steam admixing to milk is concerned.

Figure 5:
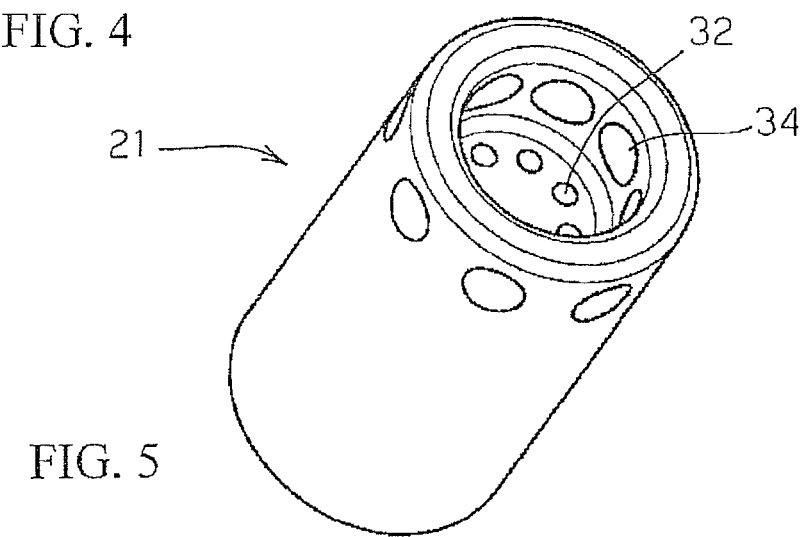

In accordance with a fourth embodiment of diffuser 21, shown in FIG. 5, first holes 32, for instance holes with cylindrical shape and circular cross-section, are arranged for instance parallel to the longitudinal axis of the diffuser, and second holes 34, for instance holes with cylindrical shape and circular cross-section, are substantially orthogonally and radially arranged relative to the longitudinal axis of the diffuser.

Such an embodiment too allows obtaining substantially equivalent effects to those of the first embodiment as far as steam admixing to milk is concerned.

Figure 6:
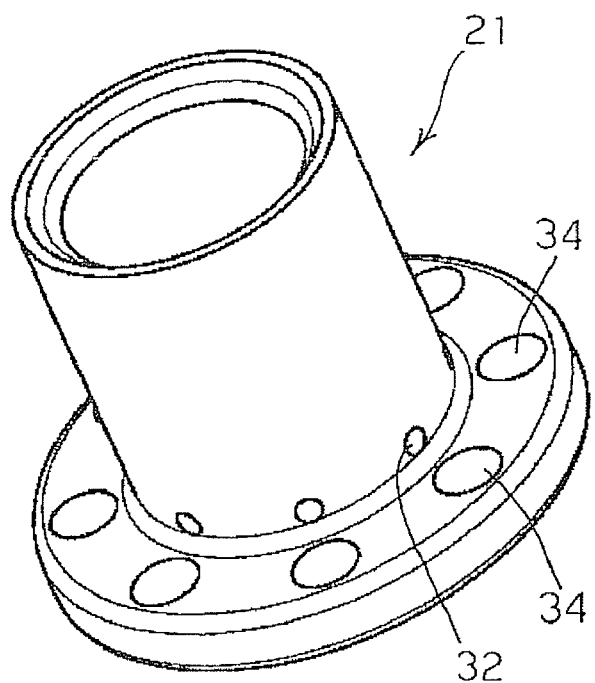

In accordance with a fifth embodiment of diffuser 21, shown in FIG. 6, first holes 32, for instance holes with cylindrical shape and circular cross-section, are orthogonally and radially arranged relative to the longitudinal axis of diffuser 21, and second holes 34, for instance holes with cylindrical shape and circular cross-section, are arranged substantially parallel to the longitudinal axis of the diffuser, downstream first holes 32.

In such an embodiment, milk to be mixed is sucked from the bottom of pot 18 (FIG. 1, FIG. 6), but substantially equivalent effects to those of the first embodiment are however obtained as far as steam admixing to the milk is concerned.

Figure 7:
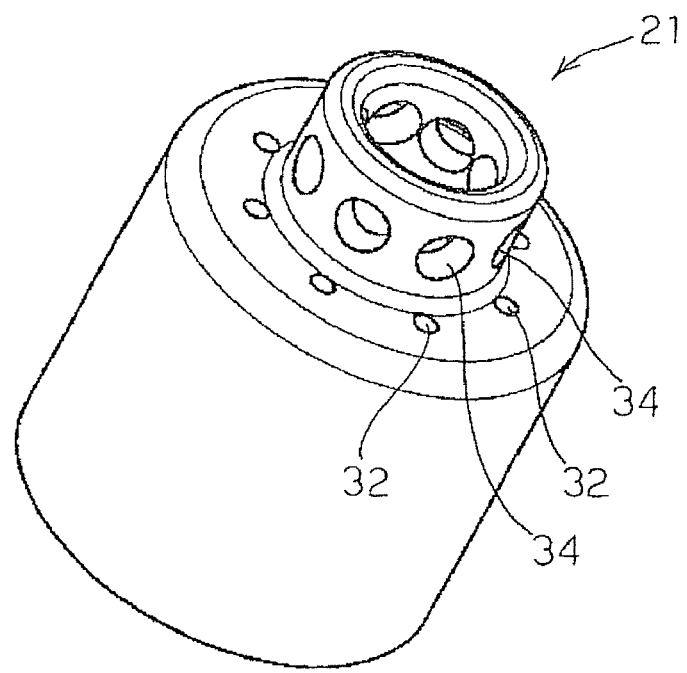

In accordance with a further embodiment of diffuser 21, shown in FIG. 7, first holes 32, for instance holes with cylindrical shape and circular cross-section, are arranged along a first circumference and the second holes, for instance holes with cylindrical shape and circular cross-section, are arranged along a second circumference whose radius is smaller than the radius of the first circumference.

In accordance with such an embodiment, milk is mixed externally of the diffuser and sucked from a central region of the same diffuser.

The operation of the device and the diffuser is as follows. By way of example, reference is made to the first embodiment and to a device associated with a coffee machine.

Pressurised steam generated by boiler 11 (FIG. 1, FIG. 2a, FIG. 2b, FIG. 3a) is conveyed to pipe 15 and, at end 20 thereof, it reaches diffuser 21 arranged to admix steam to milk.

More particularly, diffuser 21 is arranged to induce the following fluo-dynamic behaviour, shown by dashed-line arrows for instance in FIG. 3a, in steam at end 20 of pipe 15: at end 20 of pipe 15, i.e. in region A, steam is at high pressure and low speed (high pressure, low kinetic energy); near the outlets of first holes 32, or, in other words, in region B1, steam takes a reduced pressure and a high speed (low pressure, high kinetic energy) due to the action of first holes 32 forming a plurality of venturi. Thus, at widening 33, near the outlets of first holes 32, the pressure fall due to the high steam speed causes milk sucking from region C (region external to diffuser 21) into widening 33 through the second plurality of throughholes 34.

By summarising, thanks to the described structure, the Venturi effect generated by the first plurality of holes 32 is fully exploited in order to move milk through the second plurality of holes 34, so that, in region B1-B, steam transfers the whole of its kinetic energy to milk surrounding end 20 of steam pipe 15.

In the different embodiments, the holes in the first and second pluralities 32 and 34, respectively, have been described and shown as throughholes with cylindrical shape and circular cross-section, but, as it can be readily understood by the skilled in the art, the holes can also have other shapes and cross-sections, without thereby departing from the scope of what is described and claimed.

Moreover, the holes in the first and second pluralities 32 and 34, respectively, have been described and shown as arranged along circumferences, but, as it can be readily understood by the skilled in the art, the hole arrangement can even be different from that disclosed even if, in any case, the first and second pluralities are preferably concentrically arranged with respect, for instance, to a symmetry axis, preferably coinciding with the longitudinal axis of the end of pipe 15.

Contrary to the prior art devices, the diffuser as described and shown, or as it can be made according to possible variant embodiments, fully exploits Venturi effect spontaneously generated by steam outlet region B1 downstream region A, and conveys milk from region C directly into regions B1-B, thereby ensuring a more effective transfer of kinetic energy from steam to milk or other beverage.

As it can be readily understood by the skilled in the art, in further embodiments steam can be replaced by air or other fluid or it may comprise air sucked from the outside in known manner.

Of course, obvious changes and/or modifications can be made to the above description in respect of the sizes, shapes, materials, components and connections, as well as in respect of the details of the illustrated construction and the operating method, without departing from the scope of the invention as set forth in the following claims.

The invention claimed is:

1. A component configured to be associated with a pipe arranged to supply a pressurised fluid to be admixed to a beverage, said component including a venturi having a first, upstream region at high pressure and low kinetic energy, and a second, downstream region at low pressure and high kinetic energy for said fluid, characterised by:
a first plurality of throughholes arranged to form said venturi and to put said first region in communication with said second region;
a second plurality of throughholes arranged so as to converge towards said second region.

2. The component as claimed in claim 1, characterised in that the holes in said first plurality of throughholes are arranged along a first circumference, and the holes in said second plurality of throughholes are arranged along a second circumference.

3. The component as claimed in claim 2, characterised in that the holes in said second plurality are arranged along a second circumference external to said first circumference.

4. The component as claimed in claim 2 characterised in that the holes in said second plurality are arranged along a second circumference internal to said first circumference.

5. The component as claimed in claim 1, characterised in that the holes in said first and/or second plurality have cylindrical shape.

6. The component as claimed in claim 2, characterised in that the holes in said first and/or second plurality have cylindrical shape.

7. The component as claimed in claim 3, characterised in that the holes in said first and/or second plurality have cylindrical shape.

8. The component as claimed in claim 4, characterised in that the holes in said first and/or second plurality have cylindrical shape.

9. The component as claimed in claim 1, characterised in that the holes in said second plurality are arranged so as to define an angle of about 90° with respect to the holes in said first plurality.

10. The component as claimed in claim 2, characterised in that the holes in said second plurality are arranged so as to define an angle of about 90° with respect to the holes in said first plurality.

11. The component as claimed in claim 1, characterised in that said component has a given longitudinal axis and wherein said holes in said first plurality or said holes in said second plurality are arranged to define an angle of 0° to 45° relative to said longitudinal axis.

12. A device for admixing a fluid to a beverage, including a pipe arranged to supply the fluid into the beverage, characterised in that it includes the component as claimed in claim 1 associated with said pipe.

13. A device for admixing a fluid to a beverage, including a pipe arranged to supply the fluid into the beverage, characterised in that it includes the component as claimed in claim 2 associated with said pipe.

14. A device as claimed in claim 12, characterised in that said fluid is pressurised steam.

15. A device as claimed in claim 12, characterised in that said fluid is pressurised air.

16. A method of admixing fluid to a beverage by means of a pipe arranged to supply, at one end, the fluid into the beverage, the method comprising the steps of:
forming a venturi having a first, upstream region at high pressure and low kinetic energy, and a second, downstream region at low pressure and high kinetic energy with respect to said first region, said venturi being formed by means of a first plurality of throughholes;
forming a third region by means of a second plurality of throughholes arranged to converge towards said second region; and
conveying the beverage from said third region to said second region due to the effect of the low pressure in said second region, in order to admix the fluid to said beverage.

17. The method as claimed in claim 16, characterised in that said step of forming a venturi comprises arranging said first plurality of throughholes along a first circumference, and said step of forming a third region comprises arranging said second plurality of throughholes along a second circumference external to said first circumference.

18. The method as claimed in claim 16, characterised in that said step of forming a venturi comprises arranging said first plurality of throughholes along a first circumference, and said step of forming a third region comprises arranging said second plurality of throughholes along a second circumference internal to said first circumference.

19. The method as claimed in claim 16, characterised in that said step of forming a third region comprises arranging the holes in said second plurality so as to define an angle of about 90° with respect to the holes in said first plurality.

20. The method as claimed in claim 16, characterised in that said step of forming said first plurality of throughholes and said second plurality of throughholes comprises arranging the holes in said first plurality or said second plurality so as to define an angle of 0° to 45° relative to a longitudinal axis of said end of said pipe.

* * * * *